US012362470B1

(12) United States Patent
Heinrich et al.

(10) Patent No.: US 12,362,470 B1
(45) Date of Patent: Jul. 15, 2025

(54) SYSTEMS, METHODS, AND APPARATUS FOR DETERMINING CHARACTERISTICS OF A RADOME

(71) Applicant: Waymo LLC, Mountain View, CA (US)

(72) Inventors: Stephan Heinrich, Mountain View, CA (US); Michael Fina, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 423 days.

(21) Appl. No.: 17/530,108

(22) Filed: Nov. 18, 2021

(51) Int. Cl.
*H01Q 1/42* (2006.01)
*G01S 13/931* (2020.01)
*H01Q 1/32* (2006.01)

(52) U.S. Cl.
CPC ............ *H01Q 1/42* (2013.01); *G01S 13/931* (2013.01); *G01S 2013/93273* (2020.01); *H01Q 1/3275* (2013.01)

(58) Field of Classification Search
CPC ...... H01Q 1/42; H01Q 1/3275; G01S 13/931; G01S 2013/93273
See application file for complete search history.

(56) References Cited

U.S. PATENT DOCUMENTS

| 5,371,505 A | 12/1994 | Michaels |
| 5,398,035 A * | 3/1995 | Densmore ................ H01Q 3/04 343/840 |
| 6,366,232 B1 | 4/2002 | Liedtke et al. |
| 6,414,623 B1 | 7/2002 | Ashihara |
| 7,271,880 B2 | 9/2007 | Samukawa et al. |

(Continued)

FOREIGN PATENT DOCUMENTS

| EP | 3486996 A1 * | 5/2019 | ............ B61L 23/041 |
| JP | H0659024 A | 3/1994 | |

(Continued)

OTHER PUBLICATIONS

17530108_2024-03-12_WO_2010097138_A1_M.pdf, machine translation of WO-2010097138-A1 (Year: 2010).*

(Continued)

*Primary Examiner* — William Kelleher
*Assistant Examiner* — Kenneth W Good
(74) *Attorney, Agent, or Firm* — McDonnell Boehnen Hulbert & Berghoff LLP

(57) ABSTRACT

Example embodiments relate to systems, apparatus, and methods for determining a characteristic of a radome. An example apparatus may comprise a computing device configured to cause a first radar signal to be transmitted toward an object and to receive first radar data representative of a first reflected radar signal. The computing device may also be configured to determine a first parameter associated with the first reflected radar signal based on at least the first radar data and to cause a second radar signal to be transmitted toward the object after a fluid is applied to the radome. Further, the computing device may be configured to receive second radar data representative of a second reflected radar signal, determine a second parameter associated with the second reflected radar signal based on at least the second radar data, and compare the first parameter to the second parameter.

18 Claims, 6 Drawing Sheets

(56) References Cited

U.S. PATENT DOCUMENTS

| | | | |
|---|---|---|---|
| 8,558,730 B2 | 10/2013 | Hassen | |
| 9,116,241 B2 | 8/2015 | Bechler | |
| 10,288,661 B2 | 5/2019 | Ahmed et al. | |
| 10,333,205 B2 | 6/2019 | Kamo | |
| 10,401,490 B2 | 9/2019 | Gillian et al. | |
| 11,061,112 B2 | 7/2021 | Fischer | |
| 2002/0163463 A1* | 11/2002 | Lajiness | G01S 7/4004 342/174 |
| 2003/0169198 A1* | 9/2003 | Hofmann | G01S 7/4056 342/174 |
| 2005/0110673 A1 | 5/2005 | Izumi et al. | |
| 2007/0040727 A1* | 2/2007 | Matsuoka | G01S 7/4004 342/87 |
| 2010/0239870 A1* | 9/2010 | Bowen | C09D 5/32 427/535 |
| 2018/0128901 A1* | 5/2018 | Pointer | G01S 13/04 |
| 2020/0200868 A1* | 6/2020 | Meier | H01Q 1/02 |
| 2020/0319299 A1 | 10/2020 | Pointer et al. | |
| 2021/0096214 A1 | 4/2021 | Campbell et al. | |
| 2021/0168626 A1* | 6/2021 | Okawa | H04W 52/0206 |
| 2021/0255276 A1 | 8/2021 | Kim | |
| 2024/0149923 A1* | 5/2024 | Fang | G06V 20/56 |

FOREIGN PATENT DOCUMENTS

| | | | | |
|---|---|---|---|---|
| JP | H10282229 | A | 10/1998 | |
| JP | 2005291808 | A | 10/2005 | |
| JP | 2009250640 | A | 10/2009 | |
| JP | 4629686 | B2 | 2/2011 | |
| JP | 5059904 | B2 | 10/2012 | |
| WO | WO-2010097138 | A1 * | 9/2010 | G01S 13/34 |

OTHER PUBLICATIONS

Qamar et al., "An Accurate Method for Designing, Characterizing, and Testing a Multi-Layer Radome for mm-Wave Applications", IEEE Access; vol. 8, Jan. 30, 2020, pp. 23041-23053.

R.W. McMillan et al., "A model for determination of radome transmission, reflection, depolarization, loss, and effects on antenna patterns", 1998 IEEE Radar Conference, Aug. 6, 2002.

* cited by examiner

SYSTEMS, METHODS, AND APPARATUS FOR DETERMINING CHARACTERISTICS OF A RADOME

BACKGROUND

This background description is provided for the purpose of generally presenting the context of the disclosure. Unless otherwise indicated herein, material described in this section is neither expressly nor impliedly admitted to be prior art to the present disclosure or the appended claims.

An autonomous vehicle or autonomously driven vehicle (ADV) may navigate a path of travel using information about the environment obtained by sensors of the vehicle. The autonomous vehicle or ADV may be equipped with various types of sensors in order to detect the environment surrounding the vehicle. For example, the autonomous vehicle may include light detection and ranging (lidar) sensors, radio detection and ranging (radar) sensors, sound navigation and ranging (sonar) sensors, image capture devices (e.g., cameras), microphone sensors, and other suitable sensors that scan and record data from the vehicle's surroundings. Sensor data from one or more of these sensors may be used to detect objects and their respective characteristics (position, shape, heading, speed, etc.). For example, a radar system or unit may detect objects and estimate the positions of the objects in the environment by transmitting radio signals (i.e., radar signals) and analyzing the returning reflected signals from the objects and other surfaces in the environment.

Autonomous vehicles may employ one or more radar systems or units for detecting and recognizing objects in the environment surrounding the vehicle. The radar system may include a radome (e.g., a radar dome or cover) to protect the internal radar components of the radar system from environmental conditions and objects in the environment. The radome may be constructed of one or more materials that permit the transmission and reception of radar signals through the radome. However, the radome is often subjected to environmental elements (e.g., rain, hail, snow, road spray, dirt, contaminants, etc.) and other objects which may damage or erode the protective outer surface of the radome. When the outer surface of a radome deteriorates or is damaged, material or matter (e.g., rain, snow, moisture, road spray, etc.) may not be effectively repelled and/or dissipated from the radome. As a result, the water shedding capacity or efficacy of the radome may be reduced. For example, water droplets or moisture may accumulate on the radome causing undesired effects on the transmission properties or characteristics of the radome and/or the radar signals that pass through the radome, such as unwanted attenuation, reflection, refraction, absorption, beam deflection, beam broadening, etc. These undesired effects may decrease the detection and/or sensing capability of the radar system and reduce the accuracy of the radar measurements generated by the radar system. As a result, the performance of the radar system may be degraded or diminished as the radar signals transmitted and received by the radar system may suffer from attenuation and other undesired effects caused by the condition of the radome.

SUMMARY

The present application discloses embodiments that relate to systems, methods, and apparatus for determining transmission characteristics or properties of a radome (e.g., a radar dome or cover), such as a radome of a radar system or unit. The systems, methods, and apparatus may enable a computing device to determine the transmissivity of the radome of a radar system to verify accurate performance and operation of the radar system. For example, the computing device may determine the transmission properties or characteristics of the radome to detect undesired accumulation of matter or material (e.g., rain, snow, spray, debris, moisture, etc.) on the radome that may degrade the performance of the radar system. An alert or notification may be generated when the condition of the radome has reduced the performance of the radar system to an undesired level. For example, if the condition of the radome of a vehicle radar system attenuates radar signals that pass through the radome to an unacceptable level, a technician or a computer device or operator of vehicle may be notified that the performance of the radar system may be potentially degraded and the radome may need to be serviced (e.g., repaired, cleaned, recalibrated, etc.) and/or replaced. As a result, the reliability of the radar system may be increased and the cost effectiveness of radar operations and maintenance may be improved.

In one aspect, the present disclosure describes an apparatus for determining a characteristic of a radome. The apparatus comprises a memory for storing radar data and a computing device. The computing device may be configured to cause a first radar signal to be transmitted toward an object and to receive first radar data representative of a first reflected radar signal. The first reflected radar signal may comprise at least a portion of the first radar signal reflected from the object. The computing device may also be configured to determine a first parameter associated with the first reflected radar signal based on at least the first radar data and to cause a second radar signal to be transmitted toward the object after a fluid is applied to the radome. Further, the computing device may be configured to receive second radar data representative of a second reflected radar signal. The second reflected radar signal may comprise at least a portion of the second radar signal reflected from the object. Additionally, the computing device may be configured to determine a second parameter associated with the second reflected radar signal based on at least the second radar data and compare the first parameter to the second parameter.

In another aspect, the present disclosure describes a method for determining a characteristic of a radome. The method may include causing a first radar signal to be transmitted toward an object and receiving first radar data representative of a first reflected radar signal. The first reflected radar signal may comprise at least a portion of the first radar signal reflected from the object. The method may also include determining a first parameter associated with the first reflected radar signal based on at least the first radar data and causing a second radar signal to be transmitted toward the object after a fluid is applied to the radome. Further, the method may include receiving second radar data representative of a second reflected radar signal. The second reflected radar signal may comprise at least a portion of the second radar signal reflected from the object. Additionally, the method may include determining a second parameter associated with the second reflected radar signal based on at least the second radar data and comparing the first parameter to the second parameter.

In another aspect, the present disclosure describes a non-transitory computer-readable medium configured to store instructions, that when executed by a computing system comprising one or more processors, causes the computing system to perform operations. The operations may include causing a first radar signal to be transmitted through a radome toward an object and receiving first radar data representative of a first reflected radar signal. The first reflected radar signal may comprise at least a portion of the first radar signal reflected from the object. The operations may include determining a first parameter associated with the first reflected radar signal based on at least the first radar data and causing a second radar signal to be transmitted through the radome toward the object after a fluid is applied to the radome. Further, the operations may also include receiving second radar data representative of a second reflected radar signal. The second reflected radar signal may comprise at least a portion of the second radar signal reflected from the object. Additionally, the operations may include determining a second parameter associated with the second reflected radar signal based on at least the second radar data and comparing the first parameter to the second parameter.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
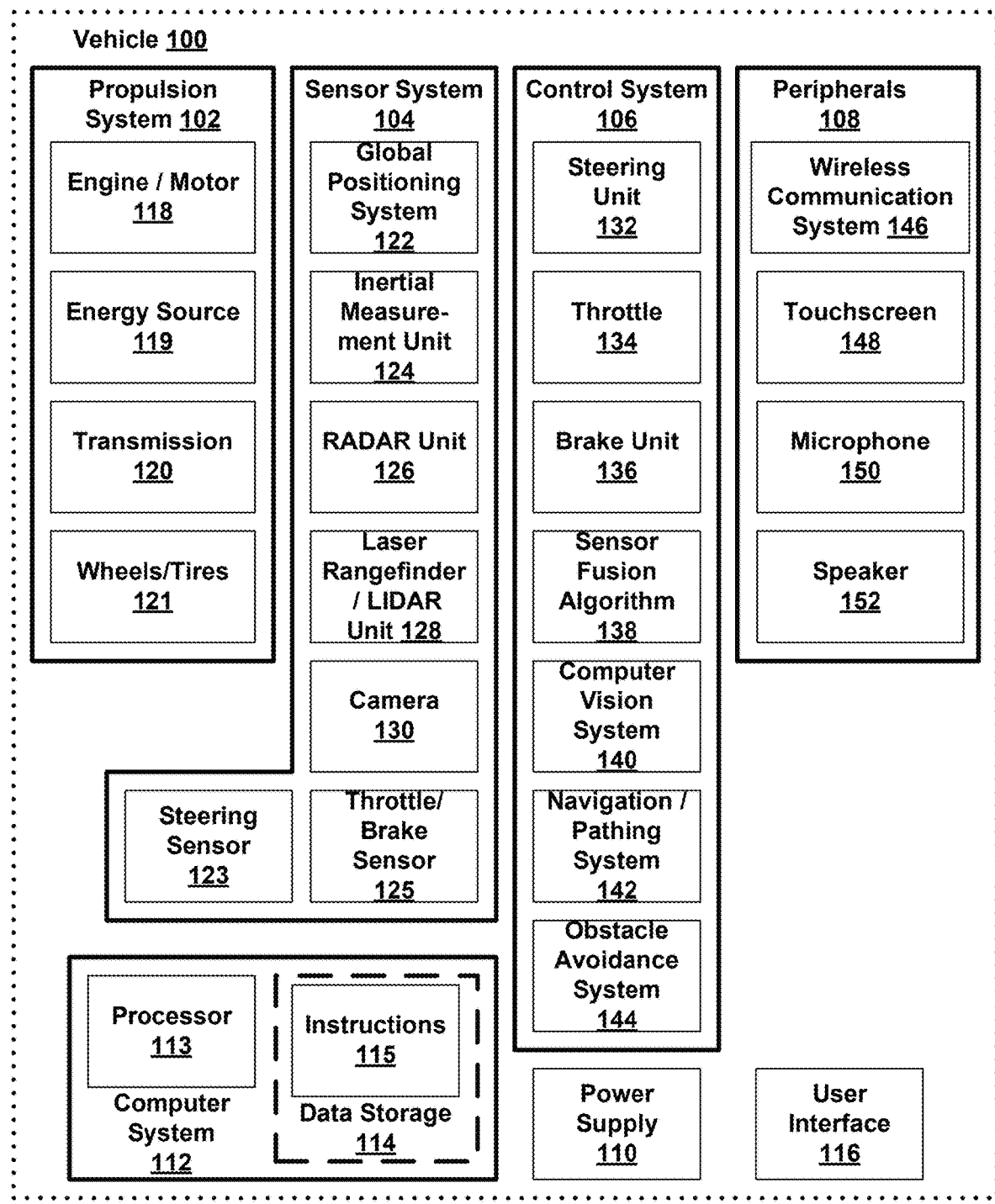
FIG. 1 is a functional block diagram illustrating systems of a vehicle, according to an example implementation.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system or unit may be used for detecting objects and estimating their positions in the environment by transmitting electromagnetic or radio signals (i.e., radar signals) and analyzing the backscattered or reflected return signals from the objects and other surfaces in an environment. The radar system may use one or more antennas to emit (i.e., transmit) radar signals to measure aspects of the environment. For example, the radar system may estimate a range for objects by transmitting short pulses and/or coded waveforms, such as pulsed Doppler radar signals. Upon coming into contact with objects or surfaces in the environment, the emitted radar signals may scatter in multiple directions with some penetrating into various surfaces while others reflect off surfaces and back towards one or more receiving antennas of the radar system. Once received by the one or more receiving antennas, the radar system may process the reflected radar reflections to generate two dimensional (2D) and/or three dimensional (3D) measurements that represent aspects of the environment, such as the positions, orientations, and movements (including non-movements) of nearby objects and other surfaces located in the surrounding environment.

Because radar systems or units may be used to measure distances and motions of nearby objects and other surfaces, radar systems are being increasingly incorporated into vehicles for obtaining and providing useful information for vehicle navigation, obstacle avoidance, and other vehicle operations that may boost overall vehicle safety. For instance, the radar systems may be used to detect and potentially identify the positions, orientations, and movements (including non-movements) of nearby vehicles, bicycles, pedestrians, animals, and objects surrounding a vehicle. The radar systems may also provide information about other features in the vehicle's surrounding environment, such as the location, arrangement, and position of road boundaries, road conditions (e.g., smooth or bumpy surfaces), weather conditions (e.g., wet or snowy roadways), and the relative positions of traffic signs and signals. As such, the radar systems may provide a way for vehicle systems to continuously monitor and understand changes during navigation in various environments and may supplement radar sensor data from other types of sensors.

Further, the radar systems may provide information aimed to assist the vehicle's driver. For instance, radar measurements may be used to generate alerts when the vehicle drifts outside its lane, when the vehicle travels too closely to another vehicle or object, and/or in other ways that can help the driver safely control the vehicle. The radar measurements may also be used to help enable autonomous or semi-autonomous operations by the vehicle. In particular, radar data may be used by control or computer systems to navigate the vehicle's environment.

A vehicle radar system can include one or more radar systems or units positioned at various locations on a vehicle. For instance, one or more radar systems may be coupled to the vehicle at various positions, such as side mirrors, bumpers, the roof, front grill, doors, the trunk, or side panels on the vehicle. Using exterior locations to attach and position radar systems may enable swift installation of the radar systems on a standard vehicle without requiring redesigning and specially manufacturing the vehicle. In addition, the orientation and position of the radar systems when the radar systems are coupled at exterior vehicle locations may be easily adjusted. This may also speed up the installation and calibration processes. By using exterior positions on the vehicle, the radar system may be able to capture measurements from optimal positions and orientations on the vehicle.

When a radar system is located on the exterior of the vehicle, the radar system may undesirably encounter contact from road debris, which can damage and degrade the performance of the radar system. For instance, as the vehicle navigates a path, debris (e.g., rocks, pieces of road, etc.) may be kicked up and propelled towards the radar system by the vehicle and other nearby vehicles. This debris can damage the radar system and impact subsequent performance of the vehicle radar system overall. In addition, puddles and snow that accumulate on the road can be propelled towards the vehicle by nearby vehicles and similarly degrade the performance over time.

Further, weather conditions can also create conditions that undesirably impact unprotected radar systems coupled at exterior positions on the vehicle. Rain, hail, sleet, snow, and other weather conditions may undesirably come into contact with the radome and, over time, degrade the performance and condition of the radar system. Thus, exposure to weather elements may cause the radar system to degrade and perform less optimally. Furthermore, any radar system coupled at an exterior location on a vehicle is also exposed to undesirable contact from pedestrians, such as while the vehicle is parked and not in use.

To overcome these potential issues as well as others that may arise when placing radar systems on the exterior of a vehicle, the radar system may include a radome or some form of housing or cover composed of a radio-frequency transparent material. The radome may be designed to protect and conceal one or more components of the radar system (e.g., antennas) from the environment. For example, the radome may enclose or cover the antennas of the radar system and provide protection from undesirable environmental factors, such as debris and weather conditions. The radome may be constructed from materials that allow radar signals (e.g., transmitted and received radar signals) to pass therethrough with minimum attenuation (e.g., minimum distortion, reflection, absorption, etc). For example, the radome may be formed from one or more plastic materials.

However, in some implementations, the outer surface of the radome may be susceptible to the accumulation of matter or material (e.g., rain, snow, dirt, water, etc.). For example, under certain conditions, rain, snow, road spray and/or moisture may accumulate or build up on the outer surface of the radome, and thereby adversely impact the performance of the radar system. To mitigate or help prevent matter or material from building up on the radome, the outer surface of the radome may be coated with a hydrophobic or superhydrophobic coating or film. For example, hydrophobic coatings or surfaces may be used to mitigate or reduce the amount of material or matter (e.g., rain, snow, dirt, water, etc.) that may accumulate on the radome. In some implementations, the outer surface of the radome may be curved to further facilitate water and/or snow run-off.

Because radar capabilities may help contribute to a vehicle's understanding of the surrounding environment, it may be desirable to determine the accuracy of the radar measurements of the radar system and to detect damage or deterioration of the radome. When the outer surface or coating/film of the radome deteriorates or is damaged, the transmission properties or characteristics of the radome (e.g., the outer coating or film) may be degraded and the performance and/or sensitivity of the radar system may be reduced or diminished. For example, a damaged or deteriorated outer surface or coating/film of the radome may not effectively disburse and/or repel material or matter (e.g., rain, snow, moisture, water, spray, etc.) from the radome. As such, water droplets or moisture may accumulate, build up, and/or remain on the outer surface of the radome.

The presence of the water droplets or moisture on the radome may cause undesired effects on the radar signals that pass through the radome (e.g., unwanted attenuation, reflection, refraction, absorption, beam deflection, beam broadening, etc.). These undesired effects may decrease the detection and/or sensing capability of the radar system as well as reduce the accuracy of the radar system's measurements. As a result, the performance of the radar system may be degraded or diminished as signals transmitted and received by the radar unit may suffer from attenuation and other undesired effects caused by the condition of the radome. Therefore, it might not be safe to allow a vehicle operating autonomously to navigate using a radar system having a damaged and/or deteriorated radome.

Vehicle radar systems or units may routinely undergo manual or offline inspection, testing, and/or verification to maintain proper performance and adherence to radar and/or radome specifications and requirements. For instance, human supervision or cross-sensor validation may be used to detect damage and/or deterioration of a radome of a radar system. A conventional vehicle radar verification process may involve skilled technicians operating a radar system to observe specially curated and placed calibration targets in a controlled calibration environment. As such, testing a scanning range of a radar unit may present a challenge due to the physical space needed to test the entire scanning range of the radar unit. Further, conventional radar inspection and verification processes may limit a vehicle's use. Thus, conventional processes may be highly manual, time consuming, and associated with high costs, such as costs for setup and maintenance of a suitable calibration environment.

Additionally, the amount of time involved in testing a large number of radar systems repeatedly or periodically (e.g., daily, monthly, etc.) to maintain continued adherence with radome/radar specifications and/or system requirements may result in substantial costs and delays. Further, damage or degradation of the radome may not be detected until a scheduled maintenance inspection. As such, there exists a demand for techniques for evaluating the transmission characteristics and/or properties of a radome of a radar unit to increase radar performance reliability and improve the cost effectiveness of radar operation and maintenance.

To overcome the drawbacks associated with manual inspections and offline testing of a vehicle radar system, example embodiments of the present disclosure describe techniques for monitoring, testing, and evaluating a radome. The techniques may measure and determine the transmission characteristics and/or properties of a radome of a vehicle radar system as the vehicle operates in an environment. The techniques may use radar data as a basis for monitoring and evaluating the characteristics of the radome. By performing the techniques described herein, a computing device of a radar system or vehicle may periodically (or continuously) monitor the transmissivity and/or condition of the radome and, in turn, the performance of the radar system while avoiding the downtime and costs associated with manual inspections and offline testing and evaluations.

Further, the techniques described herein may enable the transmission characteristics and/or properties of a radome of a radar system or unit to be periodically evaluated before an undesired level of degradation occurs. For example, the transmissibility of the radome may be monitored and evaluated without having to take the radar system or a vehicle out of operation. The techniques may also facilitate the continuous or periodic monitoring of the radome in the field without requiring a testing chamber or highly-controlled targets. For example, the techniques may use radar data collected during typical operations by the radar system and/or vehicle. That is, the condition of the radome and the performance of the radar system may be determined from radar reflections or returns obtained from the environment. This may eliminate the need to remove a vehicle and its radar system from service and may significantly decrease the downtime of the radar system and/or vehicle. Thus, the techniques may reduce the time and resources used to monitor and evaluate the transmission characteristics of the radome of a radar system or vehicle.

The techniques described herein may be performed by systems, methods, and apparatus that determine the transmission characteristics of a radome (e.g., a housing or cover) of a vehicle or a radar system. The systems, methods, and apparatus may use one or more computing devices (e.g., processors, field programmable gate arrays (FPGAs), etc.) onboard a vehicle, such as a computing device of a vehicle radar system or unit or a central computing system configured to control one or more systems of the vehicle. The one or more computing devices may monitor and evaluate the transmissivity of the radome to ensure accurate performance of the radar system as the vehicle operates in an environment. For example, the one or more computing devices may be configured to effectively and accurately monitor and/or evaluate the transmission properties or characteristics of the radome to detect undesired accumulation of matter or material (e.g., rain, snow, water droplets, moisture, etc.) on the radome. The one or more computing devices may obtain radar data during multiple time intervals (e.g., radar reflections or returns) and compile the radar data over multiple intervals to assess the condition of the radome and the performance of the radar system. In some instances, one or more remote computing devices may assist with monitoring and evaluating the radome of the radar system and/or vehicle.

A technician or a computing device or operator of a vehicle may be alerted and/or notified when the transmission characteristics or properties of the radome are reduced or degraded due to matter or material (e.g., water droplets, moisture, spray, etc.) on the radome. For example, water droplets and/or moisture on the radome may increase the reflection, absorption, and/or attenuation of the transmitted and reflected signals. If the accumulation of the matter or material on the radome causes the transmitted and reflected signals that propagate through the radome to degrade to an undesirable level, a technician or a computing device or operator of a vehicle may be notified that the condition of the radome and/or the performance of the radar system may be potentially degraded and the radome may need to be serviced (e.g., cleaned, repaired, etc.) and/or replaced. As a result, the reliability of the radar system may be increased and the cost effectiveness of radar operations and maintenance may be improved.

In some examples, a system or apparatus may be configured to determine the transmission characteristics and/or properties of a radome. The system may include a fluid source and a radar system. The radar system may transmit and receive radar signals and may detect or identify one or more objects or targets at a distance in an environment based on the radar signals. For example, a sign, vehicle, a tree, building, wall, landmark, a portion of a vehicle, and/or another object may be identified as a target. In some instances, the radar system can be configured to determine that the detected object satisfies a set of conditions prior to initializing a process for monitoring and/or evaluating the radome. For example, radar data indicative of the detected object (e.g., a set of peaks of the radar data) may be required to meet one or more conditions, such as that the radar data exceeds a particular signal-to-noise ratio (SNR) threshold and/or exceeds a range threshold. Within examples, the radar system may select portions of the radar data (e.g., peaks) that are each likely to represent a single target or object (e.g., a car, truck, street sign, or another large and/or metallic object) associated with a high radar cross section (RCS) that can make determinations of one or more targets more accurate.

Once an object or target is identified in the environment, the radar system may transmit radar signals toward the object. The radar system may transmit the radar signals on a first channel. The radar system may receive reflected signals of the transmitted radar signals and determine or measure one or more parameters of the reflected radar signals. The one or more parameters may be determined at the beginning of a vehicle mission, before entering wet conditions, and/or after the conclusion of the vehicle mission. The one or more parameters may be used as initial or baseline parameters to compare with parameters of subsequent reflected radar signals. In some examples, the radar system may receive reflected radar signals and determine a first parameter associated with a first reflected radar signal. Once the radar system receives the first reflected radar signal, a fluid device may be operated to apply fluid to the radome of the radar system.

After the fluid is applied to the radome, the radar system may transmit radar signals toward the object. The radar system may transmit the radar signals on the first channel (e.g., same channel). The radar system may receive reflected signals of the transmitted radar signals and determine or measure one or more parameters of the reflected signals. In some examples, the radar system may receive the reflected radar signals and determine a second parameter associated with a second reflected radar signal.

After determining the parameters associated with each of the reflected radar signals, the system may compare the parameters of the reflected signals. For example, the radar system may compare the initial or baseline parameter of the first reflected radar signal to the parameters of subsequently reflected radar signals received after the fluid has been applied to the radome. In some examples, a first parameter of a first reflected radar signal may be compared to a second parameter of a second reflected radar signal. The first and second parameter of the reflected radar signals may each comprise a power characteristic (e.g., a maximum power level, an average power level, a spectral power density, etc.), a radar bandwidth, a radar duration, a signal magnitude, an amplitude, and/or a phase. For example, the power level of the first reflected radar signal may be compared to the power level of the second reflected radar signal.

The comparison of the parameters of the reflected radar signals may be used to determine the transmissivity or condition of the radome of the radar system and to determine whether the radar system is providing accurate radar results. For example, the comparison may indicate a loss in transmissivity of the radome (e.g., radome loss) due to damage or deterioration of the radome. In some examples, the damage or deterioration of the radome may cause accumulation of undesired material or matter (e.g., moisture, water droplets, etc.) on the radome reducing the transmissivity of the radome.

Further, the radar system may determine the differences between the parameters of reflected radar signals based on the comparison. In some examples, the radar system may determine a power difference (e.g., transmission loss) between a power level associated with the first reflected radar signal and a power level associated with the second reflected signal. The difference may be used to detect a decrease in the transmissivity of the radome, damage or deterioration of the radome, and/or an accumulation of material or matter (e.g., moisture, water droplets, etc.) on the radome. For example, the formation and/or accumulation of water droplets or moisture on the radome of the radar unit may cause the transmissivity of the radome to decrease. As such, the radar system may detect material or matter on the radome (e.g., water droplets, moisture, etc.) based on the difference.

The radar system may compare the difference between the parameters of the reflected radar signals to a threshold value. The threshold value may be a reference value associated with the radar/radome specifications and/or system requirements for a particular type of the radome. When the difference between the parameters (e.g., power level) of different reflected radar signals satisfies or exceeds a threshold level or difference (e.g., a power or loss threshold), the radar system or a computing device may determine how to respond based on the difference. For example, the formation of precipitation and/or water droplets on the radome of the radar unit may cause the transmissibility of the radome to fall outside the radar and/or radome specifications.

When the transmission characteristics of the radome fail to meet a threshold value (e.g., a reference value of a radar and/or radome specifications, a pre-stored threshold value, etc.) based on the difference between the parameter of the reflect radar signals, the computing device may be configured to generate or provide a notification or alert indicating an undesired condition of the radome. For example, the radar system may provide an alert to a technician or a computing device or operator of a vehicle to investigate the radar system's performance, such as an alert that indicates that the radar system is performing poorly and/or the radar signals passing through the radome have degraded to an undesired level. For example, when the difference between the parameters (e.g., power levels) of the reflected radar signals satisfies a threshold difference, the computing device may be configured to provide a notification or alert indicating the condition of the radome and/or that the performance of the radar system may be potentially degraded and the radome may need to be repaired or replace.

In some examples, the computing device may provide an alert that indicates the radome requires cleaning and/or may initiate an automatic process that helps remove the material on the radome. For example, the computing device or a vehicle system may activate a cleaning mechanism (e.g., liquid spray, high-pressure gas tube, wiper, etc.) to attempt to clean the radome. Further, the radome may include a heating option, pressurized air blowing device, a fan, and/or a wiper that can be used to help remove the material. In other examples, the alert may indicate that transmissivity or condition of the radome has decreased to an undesirable level. As a result, the radome may be serviced (e.g., cleaned, removed, replaced, repaired, fixed, recalibrated, etc.) and/or replaced before the radar system and vehicle is put back into operation. Thus, the reliability of the radar unit may be increased and the cost effectiveness of radar operation and maintenance may be improved.

Example systems, apparatus, and methods that implement the techniques described herein will now be described in greater detail with reference to the figures. Generally, an example system may be implemented in or may take the form of a radar system or computer system of an automobile. However, a system may also be implemented in or take the form of other systems for vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating systems of an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use one or more sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include various subsystems, such as a propulsion system 102, a sensor system 104, a control system 106, one or more peripherals 108, a power supply 110, a computer or computing system 112, a data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within implementations. For instance, the control system 106 and computer system 112 may be combined into a single system that operates the vehicle 100 in accordance with various operations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and may correspond to one or a combination of an internal combustion engine, an electric motor, steam engine, or Stirling engine, among other possible options. For instance, in some implementations, the propulsion system 102 may include multiple types of engines and/or motors, such as a gasoline engine and an electric motor.

The energy source 119 represents a source of energy that may, in full or in part, power one or more systems of the vehicle 100 (e.g., an engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example implementations. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors or sensor devices, such as a Global Positioning System (GPS) 122, an inertial measurement unit (IMU) 124, a radar unit or system 126, a laser rangefinder/lidar sensor 128, a camera 130, a steering sensor 123, and a throttle/brake sensor 125, among other possible sensors. In some implementations, the sensor system 104 may also include sensors configured to monitor internal systems of the vehicle 100 (e.g., $O_2$ monitor, fuel gauge, engine oil temperature, brake wear).

The GPS 122 may include a transceiver operable to provide information regarding the position of vehicle 100 with respect to the Earth. The IMU 124 may have a configuration that uses one or more accelerometers and/or gyroscopes and may sense position and orientation changes of vehicle 100 based on inertial acceleration. For example, the IMU 124 may detect a pitch and yaw of the vehicle 100 while the vehicle 100 is stationary or in motion.

The radar unit 126 may represent one or more systems configured to use radio signals to sense objects, including the speed and heading of the objects, within the local environment of the vehicle 100. As such, the radar unit 126 may include antennas configured to transmit and receive radio signals. In some implementations, the radar unit 126 may correspond to a mountable radar unit or system configured to obtain measurements of the surrounding environment of the vehicle 100.

The laser rangefinder/lidar 128 may include one or more laser sources, a laser scanner, and one or more detectors or sensors, among other system components, and may operate in a coherent mode (e.g., using heterodyne detection) or in an incoherent detection mode. In some embodiments, the one or more detectors or sensor of the laser rangefinder/lidar 128 may include one or more photodetectors. In some examples, the photodetectors may be capable of detecting single photon avalanche diodes (SPAD). Further, such photodetectors can be arranged (e.g., through an electrical connection in series) into an array (e.g., as in a silicon photomultiplier (SiPM)).

The camera 130 may include one or more devices (e.g., a still camera or video camera) configured to capture images of the environment of the vehicle 100. In some examples, the camera may include an image sensor configured to capture a series of images (e.g., image frames) in a time-sequential manner. The image sensor may capture images at a particular rate or at a particular time interval between successive frame exposures.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of the vehicle 100. In other implementations, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate vehicle 100, which may involve using friction to decelerate the wheels/tires 121. In some implementations, brake unit 136 may convert kinetic energy of the wheels/tires 121 to electric current for subsequent use by a system or systems of the vehicle 100.

The sensor fusion algorithm 138 of the control system 106 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 of the control system 106 may include hardware and software operable to process and analyze images in an effort to determine objects, environmental objects (e.g., stop lights, road way boundaries, etc.), and obstacles. As such, the computer vision system 140 may use object recognition, Structure From Motion (SFM), video tracking, and other algorithms used in computer vision, for instance, to recognize objects, map an environment, track objects, estimate the speed of objects, etc.

The navigation/pathing system 142 of the control system 106 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the implementation, the computer system 112 could be operable to monitor many aspects of the vehicle 100 and its subsystems. In some implementations, the computer system 112 may disable some or all functions of the vehicle 100 based on signals received from the sensor system 104.

The components of the vehicle 100 could be configured to work in an interconnected fashion with other components within or outside their respective systems. For instance, in an example implementation, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar unit 126 may also provide information about the surroundings of the vehicle. In other words, a combination of various sensors (which could be termed input-indication and output-indication sensors) and the computer system 112 could interact to provide an indication of an input provided to control a vehicle or an indication of the surroundings of a vehicle.

In some implementations, the computer system 112 may make a determination about various objects based on data that is provided by systems other than the radio system. For example, the vehicle 100 may have lasers or other optical sensors configured to sense objects in a field of view of the sensors (e.g., vehicle). The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
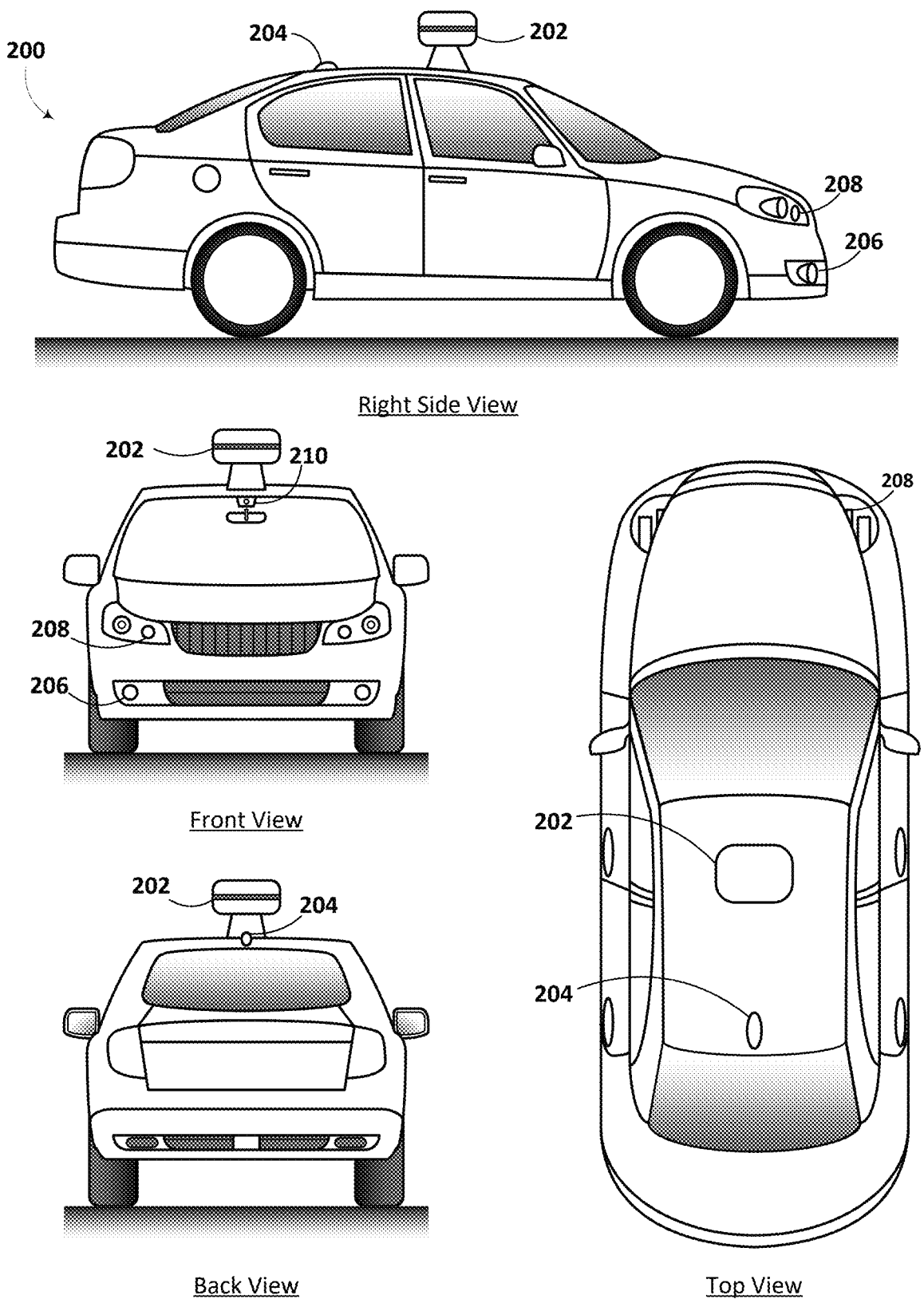
FIG. 2 is a conceptual illustration of a configuration of a vehicle, according to an example implementation.

FIG. 2 depicts an example physical configuration of the vehicle 200, which may represent one possible physical configuration of vehicle 100 described in reference to FIG. 1. Depending on the implementation, the vehicle 200 may include the sensor unit 202, the wireless communication system 204, the radio unit 206, the deflectors 208, and the camera 210, among other possible components. For instance, the vehicle 200 may include some or all of the elements of components described in FIG. 1. Although the vehicle 200 is depicted in FIG. 2 as a car, the vehicle 200 can have other configurations within examples, such as a truck, a van, a semi-trailer truck, a motorcycle, a golf cart, an off-road vehicle, or a farm vehicle, among other possible examples.

The sensor unit 202 may include one or more sensors configured to capture information of the surrounding environment of the vehicle 200. For example, the sensor unit 202 may include any combination of cameras, radars, LIDARs, range finders, radio devices (e.g., Bluetooth and/or 802.11), and acoustic sensors, among other possible types of sensors. In some implementations, the sensor unit 202 may include one or more movable mounts operable to adjust the orientation of sensors in the sensor unit 202. For example, the movable mount may include a rotating platform that can scan sensors so as to obtain information from each direction around the vehicle 200. The movable mount of the sensor unit 202 may also be movable in a scanning fashion within a particular range of angles and/or azimuths.

In some implementations, the sensor unit 202 may include mechanical structures that enable the sensor unit 202 to be mounted atop the roof of a car. Additionally, other mounting locations are possible within examples.

The wireless communication system 204 may have a location relative to the vehicle 200 as depicted in FIG. 2, but can also have different locations within implementations. The wireless communication system 200 may include one or more wireless transmitters and one or more receivers that may communicate with other external or internal devices. For example, the wireless communication system 204 may include one or more transceivers for communicating with a user's device, other vehicles, and roadway elements (e.g., signs, traffic signals), among other possible entities. As such, the vehicle 200 may include one or more vehicular communication systems for facilitating communications, such as dedicated short-range communications (DSRC), radio frequency identification (RFID), and other proposed communication standards directed towards intelligent transport systems.

The camera 210 may have various positions relative to the vehicle 200, such as a location on a front windshield of vehicle 200. As such, the camera 210 may capture images of the environment of the vehicle 200. As illustrated in FIG. 2, the camera 210 may capture images from a forward-looking view with respect to the vehicle 200, but other mounting locations (including movable mounts) and viewing angles of the camera 210 are possible within implementations. In some examples, the camera 210 may correspond to one or more visible light cameras. Alternatively or additionally, the camera 210 may include infrared sensing capabilities. The camera 210 may also include optics that may provide an adjustable field of view.

Figure 3:
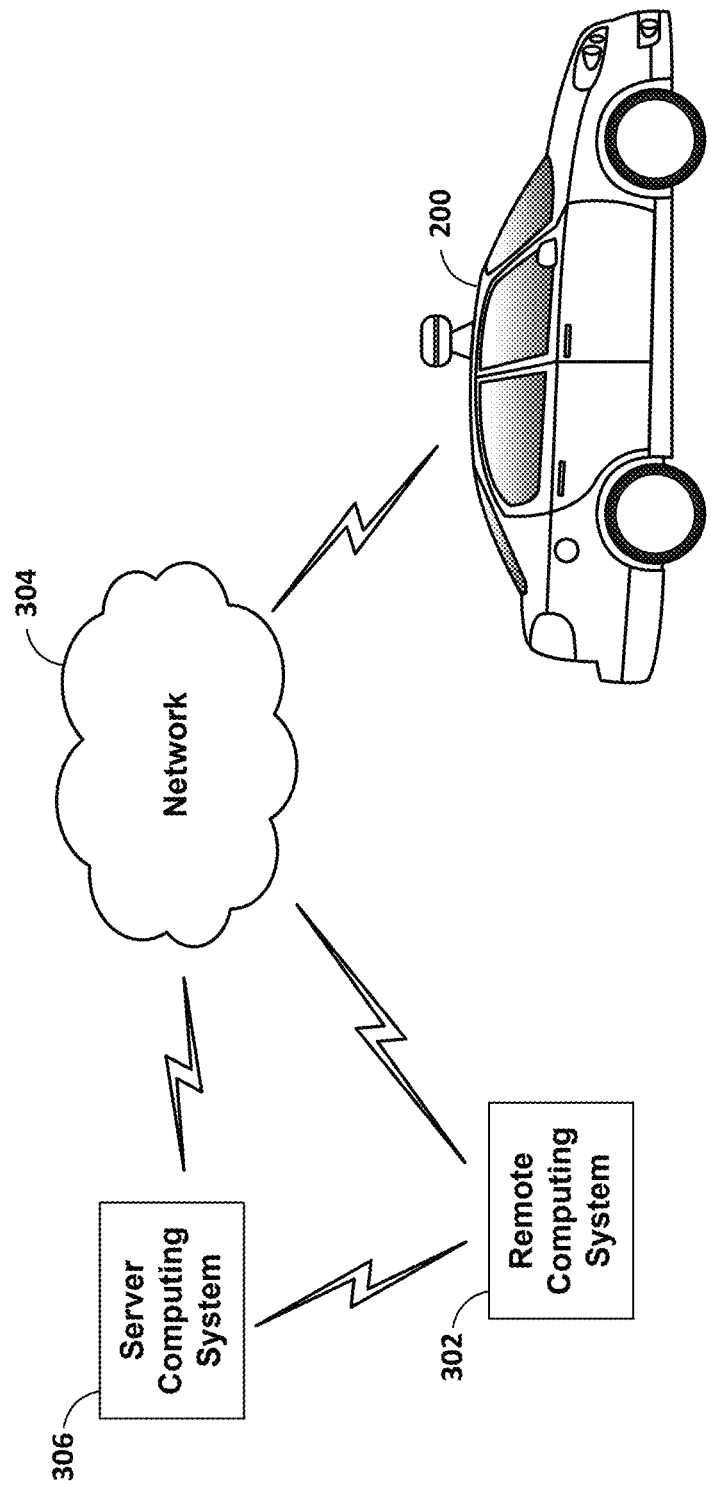
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some implementations, operations described herein that are performed by the remote computing system 302 may be additionally or alternatively performed by the vehicle 200 (i.e., by any system(s) or subsystem(s) of the vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. For example, a computing or sensor system (e.g., the remote computing system 302, the server computing system 306, or a computing system local to the vehicle 200) may operate sensors or sensor devices to capture sensor information of the environment of an autonomous vehicle. In general, at least one computing device or system will be able to analyze the sensor information and possibly control the autonomous vehicle.

In some implementations, to facilitate autonomous operation, a vehicle (e.g., the vehicle 200) may receive data representing objects in an environment in which the vehicle operates (also referred to herein as "environment data") in a variety of ways. A sensor or computing system on the vehicle may provide the environment data representing objects of the environment. For example, the vehicle may have various sensors, including a camera, a radar sensor, a laser range finder/lidar sensor, an image sensor, a microphone, and other sensors. Each of these sensors may communicate data to a computing device (e.g., a processor) in the vehicle about information each respective sensor receives.

In some implementations, the computing device (e.g., a controller or processor) or computing system may be able to combine information from the various sensors in order to make further determinations of the environment of the vehicle. For example, the processing system may combine data from a lidar sensor or a radar sensor and an image sensor to determine if another vehicle or pedestrian is in front of the autonomous vehicle. In other implementations, other combinations of sensor data may be used by the computing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The computing or processing system of the vehicle may alter the control of the vehicle based on the environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this operation, the vehicle may analyze the environment data representing objects of the environment to determine at least one object having a detection confidence below a threshold. A computing device or processor in the vehicle may be configured to detect various objects of the environment based on environment data from various sensors. For example, in one implementation, the computing device may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some implementations, the environment data may be received from a camera and include image or video data. In other implementations, the environment data may be received from a lidar sensor. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
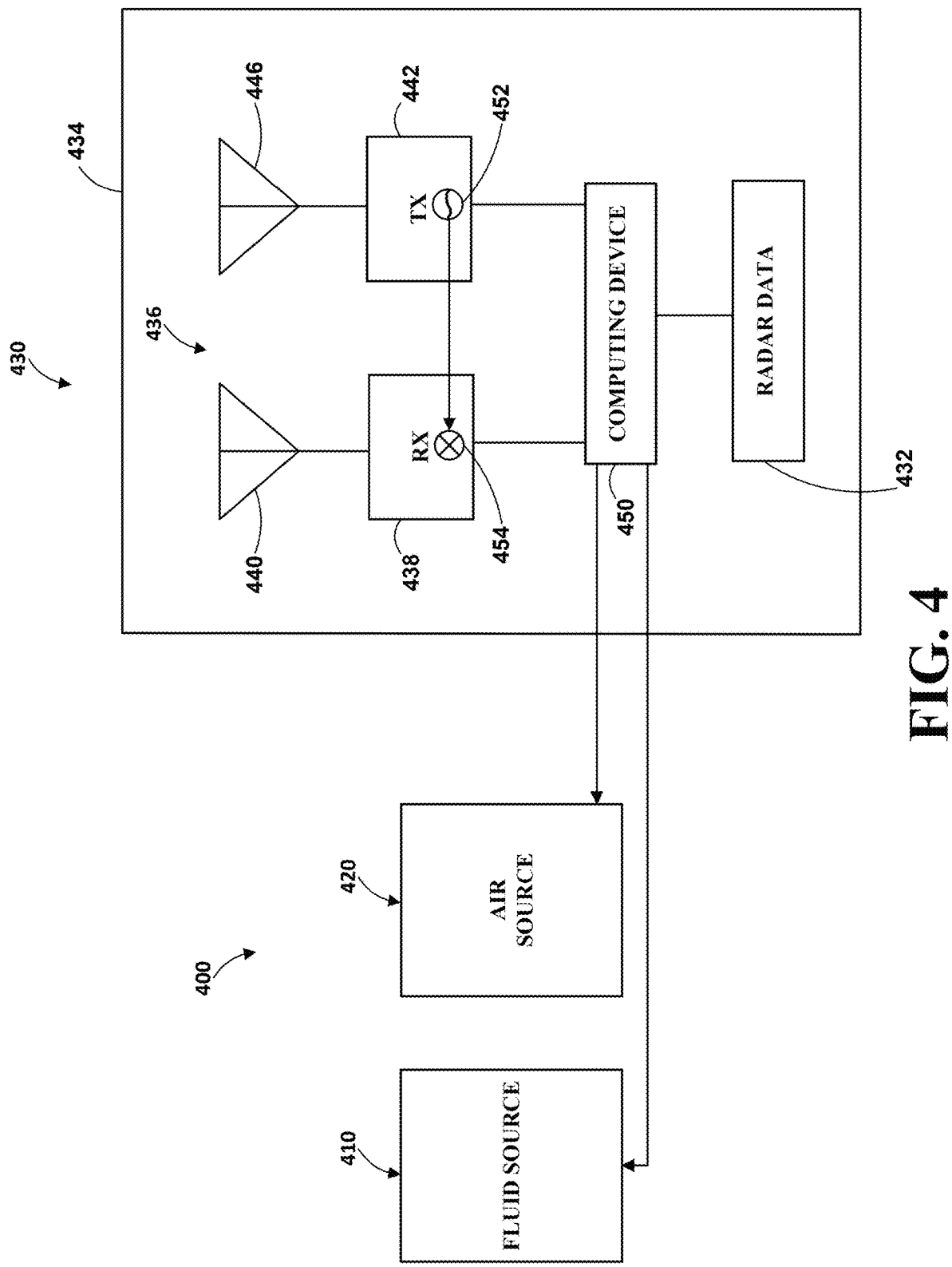
FIG. 4 is a simplified block diagram depicting components of a system, according to an example implementation.

FIG. 4 is a simplified block diagram depicting components of an example system 400 for monitoring and evaluating a radome. An autonomous vehicle may include one or more one of the systems 400. For example, the vehicle may include a system (e.g., system 400) mounted to a top of the vehicle and another system may be located at the front of the vehicle. In other examples, the various systems may be located in various different positions throughout the vehicle.

The system 400 may include a fluid source 410, an air source or blower (e.g., an air puffer system) 420, and a radar system 430. The radar system 430 may correspond to the radar system or unit 126 of FIG. 1. The radar system 430 may be operated to repeatedly (e.g., periodically) scan the environmental surroundings and generate radar data 432 (e.g., position data). In this way, the radar system 430 may be used to dynamically estimate positions of reflective features in the environment. In some examples, the radar data 432 may be used by a control system of an autonomous vehicle to make navigational decisions (e.g., the autonomous vehicle 100, 200 discussed above in connection with FIGS. 1-2). For example, the radar data 432 may be refreshed at a frequency that is sufficient to provide information useful for real time navigation and/or obstacle avoidance for an autonomous vehicle.

As shown in FIG. 4, the radar system 430 includes a radome or cover 434 and internal radar components 436. The radome 434 may have any suitable shape and may be configured to house one or more of the internal radar components 436 of the radar system 430. In some examples, the radome 434 may be a dome-shaped cover. The radome 434 may be comprised of any suitable materials such as plastic, glass, polycarbonate, polystyrene, acrylic, polyester, etc. to allow radar signals to pass therethrough. In some examples, the radome 434 may be formed from a light filtering material that is at least partially transparent to wavelengths of radar signals.

To mitigate or help prevent moisture, rain, snow, water and/or other matter from building up or accumulating the outer surface of the radome, the outer surface of the radome 434 may be coated with a hydrophobic or super-hydrophobic coating or film. For example, the outer surface of the radome may have a hydrophobic or super-hydrophobic coating or film to mitigate or reduce the amount of material or matter (e.g., rain, snow, dirt, water, etc.) that may accumulate on the radome 434. In some implementations, the outer surface of the radome may be curved to further facilitate water and/or snow run-off. Other configurations of the radome 434 are possible as well.

The internal radar components 436 of the radar system 430 may be positioned within the radome 434 and may transmit and receive one or more radar signals through the radome 434. The internal radar components 436 may include a receiver 438 configured to receive signals from a receiving antenna 440 and a transmitter 442 configured to emit signals from a transmitting antenna 446. The receiver 438 and transmitter 442 may each be connected to a computing device 450, which provides commands and control instructions to both the transmitter 442 and the receiver 438.

The computing device 450 may send instructions to the transmitter 442 to cause radar signals to be emitted from the transmitting antenna 446. The transmitter 442 may include local oscillators, mixers, amplifiers and the like to create driving signals to operate to the transmitting antenna 446 in accordance with the instructions from the computing device 450. The transmitting antenna 446 may receive the driving signals from the transmitter 442 and emit radar signals or waves. The emitted signals from the transmitting antenna 446 may be reflected back by surfaces in the environment and detected by the receiving antenna 440. For example, upon coming into contact with objects or surfaces in the environment, the emitted radar signals may scatter in multiple directions with some penetrating into various surfaces while others reflect off objects or surfaces and back towards the receiving antenna 440 of the radar system 430.

The reflected signals received at the receiving antenna 440 may be provided to the receiver 438. The receiver 438 may condition the signals for further processing by the computing device 450. For example, the receiver 438 may include one or more mixers, filters, amplifiers, samplers, down converters, analog to digital converters, and the like to generate digital data or an output. The digital data may be provided to the computing device 450 based on the reflected signals received at the receiving antenna 440.

As shown in FIG. 4, a signal can be conveyed from a local oscillator 452 included in the transmitter 442 to the receiver 438. The conveyed signals can be a copy of the transmitted radiation or signals. The receiver 438 may include a mixer 454 to mix the signals from the local oscillator 452 (i.e., a copy of the transmitted signal) with the reflected signal or radiation received via the receiving antenna 440. The output of the mixer 454 may then indicate the relative frequency shift of the reflected signals or radiation, such as due to Doppler Effect frequency shifts in the reflected signals. The local oscillator 452 may thereby be used as reference signals to compare with the received reflected signals and thereby sensitize the radar system 430 to the reflected signals from objects in motion relative to the radar system 430. The local oscillator signals sent back to the mixer 454 in the receiver 438 may then be used as reference signals to compensate for time-variant frequency patterns.

In some examples, one or both of the antennas 440, 446 may be directional antennas that are scanned across a scanning zone. For example, one or both of the antennas 440, 446 may be scanned across a scanning zone with an azimuthal span. Information indicative of the orientations of one or both antennas may then be used to determine the direction toward any reflective features that are detected. Thus, a map of reflective features surrounding the radar system 430 may be constructed by combining the range information (based on time of frequency offset of the emitted and received signals) and the direction information (according to orientations of the transmitting and/or receiving antennas 440, 446).

The computing device 450 of the system 400 may process the received reflected radar signals to generate the radar data 432. In some examples, the radar data 432 may include two dimensional (2D) and/or three dimensional (3D) measurements that represent aspects of the environment, such as the positions, orientations, and movements (including non-movements) of nearby objects and other surfaces located in the surrounding environment. Further, the radar data 432 may indicate the estimated locations of the reflective features. The radar data 432 may be output by the computing device 410.

The computing device 450 of the system 400 may monitor and evaluate the transmissivity of the radome 434 of the radar system 430 to ensure accurate and reliable performance of the radar system 430. For example, the computing device 450 may be configured to effectively and accurately monitor and/or evaluate the transmission properties or characteristics of the radome 434 to detect the accumulation of matter or material (e.g., water droplets, precipitation, etc.) on the radome 434. The computing device 450 may receive the radar data 432 during multiple time intervals (e.g., radar returns) and compile the radar data 432 over multiple intervals to assess the performance of the radar system. In some instances, one or more remote computing devices or vehicle computing devices can assist with the monitoring and evaluating the radar system 430.

The computing device 450 of the system 400 may include one or more electronic components and/or elements arranged to facilitate certain operations of the system 400. For example, the computing device 450 may comprise one or more general-purpose processors, one or more special-purpose processors, servos, and/or other types of computing devices or controllers. Additionally or alternatively, in some examples, the computing device 450 may include circuitry wired to perform one or more of the operations described herein. For example, the computing device 450 may include one or more pulse circuits that provide pulse timing signals for triggering emission of pulses or other signals by the transmitter 442.

The computing device 450 may also include memory or data storage (not shown) to store program instructions executable by the computing device 450 to cause the system 400 to perform the various operations described herein. The data storage may be optionally integrated in whole or in part with the computing device 450. The data storage may comprise one or more volatile and/or one or more non-volatile storage components, such as optical, magnetic, and/or organic storage. Further, the computing device 450 may communicate with an external computing device, controller or the like so as to help facilitate transfer of control signals and/or data between the external computing device and the various components of system 400.

The computing device 450 of the system 400 may analyze the radar data provided by the receiver 438 to estimate ranges of the radio-reflective features responsible for the reflected radar signals detected by the receiving antenna 440. The computing device 450 may, for example, determine the time delay between the emission of radiation or signals from the transmitting antenna 446 and the reception of corresponding reflected radiation or signals at the receiving antenna 440. The determined time delay may then be used to determine the distance to the radio-reflective features based on the measured time-of-flight. Additionally or alternatively, the radar system 430 may be operated in a frequency modulated continuous wave (FMCW) mode where the transmitter 440 causes the transmitting antenna 446 to emit a signal with a time-changing frequency. The emitted signal may have a frequency that changes in time in accordance with a frequency saw tooth pattern, for example. When the time-changing frequency pattern of the emission signal is well characterized, the frequency difference between the received reflected signals and the emitted signal may be mapped to a corresponding time delay between emission and reception.

In some examples, the computing device 450 may receive radar data during the operation of the vehicle and may be configured to determine or identify one or more objects or targets in the environment based on the radar data. For example, a sign, vehicle, a tree, building, wall, landmark, a portion of a vehicle, and/or another object may be identified as a target. In some examples, the computing device 450 may determine a static object (e.g., a tree, street sign, light pole, a part of the vehicle etc.) as a target within the field of view of the radar system. Once the object or target is identified, its radar reflections may be determined based on the received radar signals.

In some instances, the computing device 450 can be configured to determine that the detected object satisfies a set of conditions. For example, the radar data indicative of the detected target or object (e.g., a set of peaks of the radar data) may be required to meet one or more conditions, such as that the radar data exceeds a particular signal-to-noise ratio (SNR) threshold and/or satisfies a range threshold (e.g., a minimum or maximum distance of the target). In some examples, the computing device 450 may select portions of the radar data (e.g., peaks) that are each likely to represent a single target object (e.g., a vehicle or a portion thereof, street sign, or another large and/or metallic object) associated with a high radar cross section (RCS) that may make the determination of one or more targets more accurate.

Once the object or target in the environment is identified by the computing device 450, the computing device 450 may cause radar signals to be transmitted toward the object. The computing device 450 may receive data representative of the reflected radar signals of the transmitted radar signals and determine or measure one or more parameters of the reflected radar signals. The computing device may determine parameters for each of a plurality of reflected radar signals. The one or more parameters may be determined at the beginning of a vehicle mission, before entering wet conditions, and/or after the conclusion of the vehicle mission. For example, the computing device 450 may determine a first or baseline parameter associated with a first reflected radar signal of a transmitted radar signal at the beginning of the mission. In some examples, the computing device 450 may determine an average of the parameters associated with a plurality of reflected radar signals. In other examples, the computing device 450 may determine the parameters associated with a plurality of reflected radar signals for a new radome prior to any deterioration or damage to the outer surface of the radome.

Once the radar system 430 receives the reflected signals, the computing device 450 may cause a fluid to be applied to the radome 434 of the radar system 430. For example, a fluid source may be operated to apply a fluid to the radome 434 as further described below. After applying the fluid, the computing device 450 may cause radar signals to be transmitted toward the object. In some examples, the radar signals may be transmitted after a predetermined time and have substantial the same or different intervals between the transmitted signals. The computing device 450 may receive data representative of the reflected signals of the transmitted radar signals at particular times and determine or measure one or more parameters of the reflected signals. In some examples, the computing device 450 may determine a second parameter associated with a second reflected radar signal of the transmitted radar signals. In other examples, the computing device 450 may determine an average of parameters associated with a plurality or series of the reflected radar signals.

The computing device 450 may compare one or more of the baseline parameters associated with the reflected radar signals to the one or more parameters of the subsequent reflected signals received after applying the fluid. The comparison may be used to determine the transmissivity of the radome of the radar system 430 and to determine whether the radar system 430 is providing accurate radar results. For example, when the transmission characteristics of the radome of the radar system fail to satisfy or exceed a threshold level (e.g., a power or loss threshold) based on the parameters of the reflected radar signals, the radar system or a computing device may determine how to respond based on the difference.

In some examples, a first parameter of a first reflected radar signal may be compared to a second parameter of a second reflected radar signal. The parameters of the first and second reflected radar signals may each comprise a power characteristic (e.g., a maximum power level, an average power level, a spectral power density, etc.), a radar bandwidth, a radar duration, a signal magnitude, an amplitude, and/or a phase. For example, a power level of the first reflected radar signal may be compared to a power level of the second reflected radar signal. In some examples, the computing device 450 may compare one or more of the parameters (or an average of the parameters) associated with a plurality of first reflected radar signals received prior to an application of fluid with an average of the parameters associated with a plurality of reflected radar signals received after the application of the fluid to the radome. In other examples, the computing device 450 may compare a parameter associated with a reflected radar signal to each of a series of the parameters associated with a plurality of reflected radar signals received after the application of the fluid to the radome. As such, the computing device 450 may determine a shedding rate of the radome (e.g., how fast the water clears off the outer surface of the radome).

In some examples, the computing device 450 may determine the difference between reflected radar signals (e.g., a power or loss threshold). The difference may be compared to a threshold value, such as a predetermined specification level or limit for a type of radome. In some cases, the comparison may indicate damage or deterioration of the transmissivity of the radome due to material or matter (e.g., moisture, water droplets, etc.) accumulating on the radome When the difference between the parameters (e.g., power levels) of the reflected radar signals satisfies the threshold value, the computing device 454 may be configured to provide a notification or an alert to a technician or a computing device or operator of a vehicle to investigate the radar system's performance, such as an alert that indicates that the radar signals passing through the radome 434 have degraded to an undesired level, the transmissivity or condition of the radome has been degraded, the performance of the radar system may be potentially degraded, and/or the radome the radar system is performing poorly and the radome may need to be repaired or replaced.

In some examples, the vehicle systems may provide an alert that indicates the radome requires cleaning and/or may initiate an automatic process that helps remove the material on the radome. For example, the computing device or the system may activate a cleaning mechanism (e.g., liquid spray, high-pressure gas tube, wiper, etc.) to attempt to clean the radome. Further, the system may include a heating option, pressurized air blowing device, a fan, and/or a wiper that can be used to help remove the material. Further, the computing device may include that the radome may need to be replaced, repaired, and/or fixed. As such, the radome may be serviced (e.g., cleaned, replaced, repaired, fixed, etc.) and/or replaced before the radar system and vehicle is put back into operation. Thus, the reliability of the radar unit may be increased and the cost effectiveness of radar operation and maintenance may be improved.

The fluid source or apparatus 410 of the system 400 may be configured to apply a fluid or liquid to the radome 434 of the radar system 430. For example, the fluid source 410 may include a sprayer configured to apply or spray fluid on the radome 434. The fluid source 410 may also be used to facilitate cleaning the radome or components of the radar system 430. For instance, the fluid can be applied to the radome to attempt to dissolve or remove material or matter (e.g., water droplets, moisture, dirt, etc.) disposed on a surface of the radome 434. In some examples, a wiper (e.g., similar to a windshield wiper) may be configured to attempt to remove matter or material from a surface of the radome 434. Other examples are possible.

The air source (e.g., air puffer device) 420 of the system 400 may be configured to facilitate the drying and/or cleaning of the radome 434 of the radar system 430. In some examples, the air source 420 may include a fan or blower and/or a heater. Further, the air source 420 may include a high-pressure pump configured to apply air or gas onto the surface of the radome 434 to dry the radome 434. For instance, air or a gas may be applied to attempt to dissolve or remove material and/or matter (e.g., water droplets, dirt, dust, etc.) accumulated on a surface of the radome 434.

It is noted that this arrangement of the system 400 is described for exemplary purposes only and is not meant to be limiting. As noted above, in some examples, system 400 can be alternatively implemented with fewer or more components than those shown.

Figure 5:
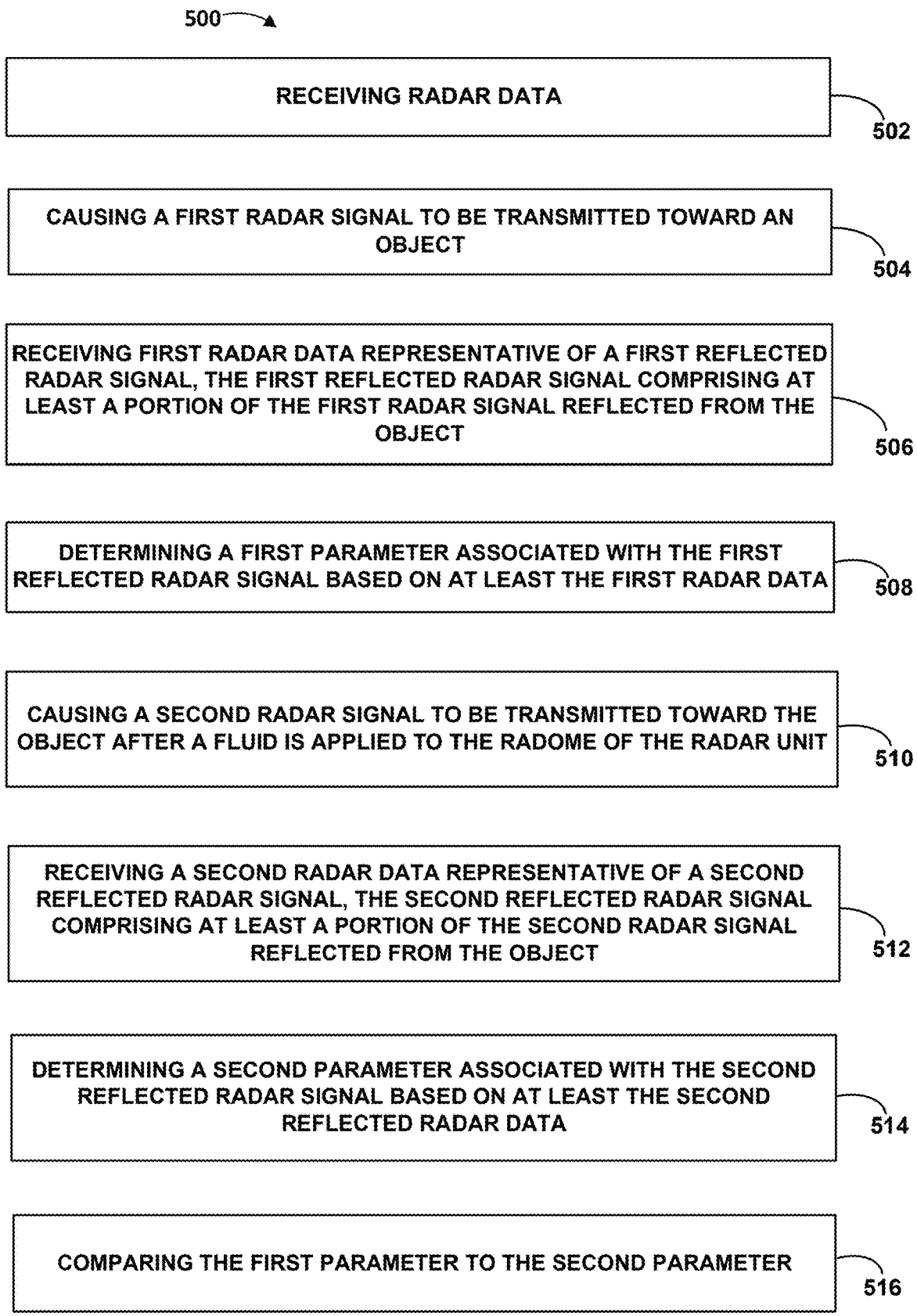
FIG. 5 is a flow chart of a method, according to an example implementation.

FIG. 5 is a flowchart of example method 500 for operating a system, according to one or more embodiments. The method 500 may include one or more operations, functions, or actions, as depicted by one or more of blocks 502-516, each of which may be carried out by any of the apparatus, systems, or devices shown in prior figures, among other possible systems.

Those skilled in the art will understand that the flow chart described herein illustrates functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

The method 500 may be performed in whole or in part by a computing device, such as a device similar to or the same as computing device 450 described above. In some embodiments, the computing device may be part of a radar system or be located onboard a vehicle, such as a central computing device. In other embodiments, one or more operations of the method 500 can be performed by a computing device that is remote from and wirelessly coupled to the vehicle (e.g., remote computing device 304 or server 306). For instance, a server can perform each of the blocks 502-516, and adjust the operations of the radar system by sending instructions to a central control system of the vehicle that, upon receipt, causes the central control system to control a vehicle radar system to adjust its operation. In addition, some examples involve using multiple computing devices, such as a combination of computing devices and FPGAs associated with the radar system.

At block 502, the method involves receiving radar data. For example, a system may include a radar system or unit configured to receive radar signals that are reflected back to the radar system by one or more surfaces in an environment. For example, the system may transmit radar signals that may reflect off various objects within the surrounding environment and be subsequently received by an antenna of the radar system. In some examples, the antenna may include at least one receiving antenna that receives signals or electromagnetic energy from the environment for subsequent processing. In some examples, the at least one receiving antenna may correspond to a first reception channel that may be a physical channel of a radar unit. The physical channel may be a single antenna or single antenna array of the radar system. In other examples, the at least one receiving antenna may include one or more uniform linear arrays (ULAs). Other types of antennas may also be used.

Once the at least one receiving antenna receives the reflected radar signals, the system may estimate positions of objects in the environment by analyzing the backscattered or reflected return signals from the objects and other surfaces in the environment. The system may process the received radar reflections to generate two dimensional (2D) and/or three dimensional (3D) measurements that represent aspects of the environment, such as the positions, orientations, and movements (including non-movements) of nearby objects and other surfaces located in the surrounding environment. The system may estimate a range for an object by transmitting short pulses and/or coded waveforms, such as pulsed Doppler radar signals.

The system may include one or more computing devices to determine or identify an object or target in the environment based on the radar data. For example, a sign, vehicle, a tree, building, wall, landmark, a portion of a vehicle, and/or another object may be identified as the target based on the radar data. Upon initial detection of a potential object, a FPGA or another device may filter the radar data to ensure that the detection corresponds to an object in the vehicle's environment. In some examples, the system may identify a static object (e.g., a tree, street sign, light pole, a part of the vehicle etc.) as a target within the field of view of the radar system. Once the object or target is identified, its radar reflections may be determined based on the received radar signals. The computing device may select portions of the radar data (e.g., peaks) that are each likely to represent a single target object (e.g., a car, truck, street sign, or another large and/or metallic object) associated with a high radar cross section (RCS) that can make determinations of objects or targets more accurate.

In some instances, the computing device can be configured to determine that the detected object satisfies a set of conditions prior to performing an evaluation of a radome. For example, the radar data indicative of the detected object (e.g., a set of peaks of the radar data) may be required to meet one or more conditions, such as that the radar data exceeds a particular signal-to-noise ratio (SNR) threshold and/or satisfies or is within a range threshold. Further, the set of conditions may be used to filter out object detections that are less useful to determine the condition of the radome. The set of conditions can be adjustable and predefined in some examples. In addition, the set of conditions may include one or more conditions that depend on the current environment of the vehicle.

At block 504, the method 500 may include causing a first radar signal to be transmitted toward an object. Once an object is identified in the environment, the radar system may transmit one or more initial radar signals toward the object. The radar system may transmit the radar signals at a frequency over a first channel of a plurality of channels of the radar system. In some examples, the system may include a radome that provides protection for the components of the system. In order to monitor and/or evaluate the transmissivity of a radome, the system may transmit the radar signals through the radome towards the object in the environment and may receive one or more reflected radar signals through the radome.

At block 506, the method 500 involves receiving first radar data representative of a first reflected radar signal that comprises at least a portion of the first radar signal reflected from the object. After the system transmits the initial radar signals at block 504, the transmitted radar signal may reflect off the object or target in the environment and may be subsequently received by the at least one receiving antenna. For example, the at least one receiving antenna of the system may be configured to receive radar signals that are reflected back to the system by one or more objects or targets in an environment. The first reflected radar signal may comprise at least a portion of the transmitted radar signal reflected from the object. The first reflected signal may be transformed into a first radar data representative of the first reflected radar signal. For example, the system may receive radar data representative of the first reflected radar signal comprising at least a portion of the first radar signal reflected from the object.

At block 508, the method 500 may involve determining a first parameter associated with the first reflected radar signal based on at least the first radar data. Once the system receives the reflected signals of the transmitted radar signals, the system may determine or measure one or more parameters of the reflected radar signals. In some examples, the system receives a first reflected radar signal and determines a first parameter associated with the first reflected radar signal. The parameter associated with the first reflected signals may comprise a power characteristic (e.g., a maximum power level, an average power level, a spectral power density, etc.), radar bandwidth, radar duration, a signal magnitude, an amplitude, or a phase. For example, the system may determine a power level associated with the first reflected radar signal.

At block 510, the method 500 may involve causing a second radar signal to be transmitted toward the object after a fluid is applied to the radome of the system. The system may transmit radar signals on the same channel as the initial radar signals. As such, the same or substantially similar signal should be received by the at least one receiving antenna and the reflected radar signals for the channel should be substantially identical, except for effects caused by radome. As such, the system may be able to determine the transmissibility of the radome based on the differences in these two reflection signals as further described below.

Once the system receives the reflected signals of the transmitted radar signals, the system may cause a fluid or liquid to be applied to the radome. For example, a fluid device may be operated to apply fluid or liquid to the radome. After applying the fluid to the radome, the system may transmit radar signals toward the object. The transmission of the radar signals may be performed at the same frequency and/or on the same channel that transmitted the initial radar signals at block 504. Thus, in some examples, block 510 of method 500 may be performed after a predetermined period of time once the fluid is applied to the radome of the radar system. In some examples, the predetermined period of time may be short, on the order of 10s of milliseconds. In some instances, block 510 may be performed immediately after applying the fluid (e.g., within milliseconds or seconds).

A block 512, the method may involve receiving second radar data representative of a second reflected radar signal comprising at least a portion of the second radar signal reflected from the object. After the system transmits the radar signals at block 510, the transmitted radar signals may reflect off the object or target within the surrounding environment and may be subsequently received by the at least one receiving antenna. For example, the at least one receiving antenna of the system may be configured to receive radar signals that are reflected back to the system by the object or target in an environment. In some examples, the system may receive a second reflected radar signal. The second reflected radar signal may comprise at least a portion of a radar signal reflected from the object or object. The second reflected signal may be transformed into second radar data representative of the second reflected radar signal. For example, the system may receive second radar data representative of a second reflected radar signal comprising at least a portion of the second radar signal reflected from the object.

At block 514, the method may include determining a second parameter associated with the second reflected radar signal based on at least the second reflected radar data. After receiving the reflected signals of transmitted radar signals, the system may determine or measure one or more parameters of the reflected radar signals. In some examples, the system receives a second reflected radar signal and determines a second parameter associated with the second reflected radar signal. The parameter of the second reflected radar signal may comprise a power characteristic (e.g., a maximum power level, an average power level, a power spectrum, etc.), radar bandwidth, radar duration, a signal magnitude, an amplitude, and/or a phase. For example, the system may determine a power level associated with a second reflected radar signal.

At block 516, the method may involve comparing the first parameter to the second parameter. The system may be able to determine the condition or transmissivity of the radome by comparing the reflected radar signals. After determining the parameters associated with each of the reflected radar signals, the system may compare the parameters of the reflected signals. For example, the system may compare the initial or baseline parameter of the first reflected radar signal to one or more parameters of subsequently reflected radar signals received after the fluid has been applied to the radome. In some examples, a first parameter of a first reflected radar signal may be compared to a second parameter of a second reflected radar signal. The first and second parameter of the reflected radar signals may each comprise a power characteristic (e.g., a maximum power level, an average power level, etc.), a radar bandwidth, a radar duration, a signal magnitude, an amplitude, and/or a phase. For example, the power level of the first reflected radar signal may be compared to the power level of the second reflected radar signal. In other examples, the system may compare the initial power level of the first reflected radar signal to power levels of a series of subsequently reflected radar signals received after the fluid has been applied to the radome.

The comparison of the parameters of the reflected radar signals may be used to determine the transmissivity or condition of the radome of the radar system and to determine whether the radar system is providing accurate radar results. For example, the comparison may indicate a loss in transmissivity of the radome (e.g., radome loss) due to damage or deterioration of the radome. In some examples, the damage or deterioration of the radome may cause accumulation of undesired material or matter (e.g., moisture, water droplets, etc.) on the radome reducing the transmissivity of the radome.

Further, the radar system may determine the differences between the parameters of reflected radar signals based on the comparison. In some examples, the radar system may determine a power difference (e.g., transmission loss) between a power level associated with the first reflected radar signal and a power level associated with the second reflected signal. The difference may be used to detect a decrease in the transmissivity of the radome, damage or deterioration of the radome, and/or an accumulation of material or matter (e.g., moisture, water droplets, etc.) on the radome. For example, the formation and/or accumulation of water droplets or moisture on the radome of the radar unit may cause the transmissivity of the radome to decrease. As such, the radar system may detect material or matter on the radome (e.g., water droplets, moisture, etc.) based on the difference.

The radar system may compare the difference between the parameters of the reflected radar signals to a threshold value. The threshold value may be a reference value associated with the radar/radome specifications and/or system requirements for a particular type of the radome. When the difference between the parameters (e.g., power level) of different reflected radar signals satisfies or exceeds a threshold level or difference (e.g., a power or loss threshold), the radar system or a computing device may determine how to respond based on the difference. For example, the formation of precipitation and/or water droplets on the radome of the radar unit may cause the transmissibility of the radome to fall outside the radar and/or radome specifications.

When the transmission characteristics of the radome fail to meet a threshold value (e.g., a reference value of a radar and/or radome specifications, a pre-stored threshold value, etc.) based on the difference between the parameter of the reflect radar signals, the computing device may be configured to generate or provide a notification or alert indicating an undesired condition of the radome. For example, the radar system may provide an alert to a technician or a computing device or operator of a vehicle to investigate the radar system's performance, such as an alert that indicates that the radar system is performing poorly and/or the radar signals passing through the radome have degraded to an undesired level. For example, when the difference between the parameters (e.g., power levels) of the reflected radar signals satisfies a threshold difference, the computing device may be configured to provide a notification or alert indicating the condition of the radome and/or that the performance of the radar system may be potentially degraded and the radome may need to be repaired or replace.

In some examples, the computing device may provide an alert that indicates the radome requires cleaning and/or may initiate an automatic process that helps remove the material on the radome. For example, the computing device or a vehicle system may activate a cleaning mechanism (e.g., liquid spray, high-pressure gas tube, wiper, etc.) to attempt to clean the radome. Further, the radome may include a heating option, pressurized air blowing device, a fan, and/or a wiper that can be used to help remove the material. In other examples, the alert may indicate that transmissivity or condition of the radome has decreased to an undesirable level. As a result, the radome may be serviced (e.g., cleaned, removed, replaced, repaired, fixed, recalibrated, etc.) and/or replaced before the radar system and vehicle is put back into operation. Thus, the reliability of the radar unit may be increased and the cost effectiveness of radar operation and maintenance may be improved.

Blocks 502-516 may be repeated based on various criteria to monitor and evaluate the transmissivity or condition of the radome of the system.

Figure 6:
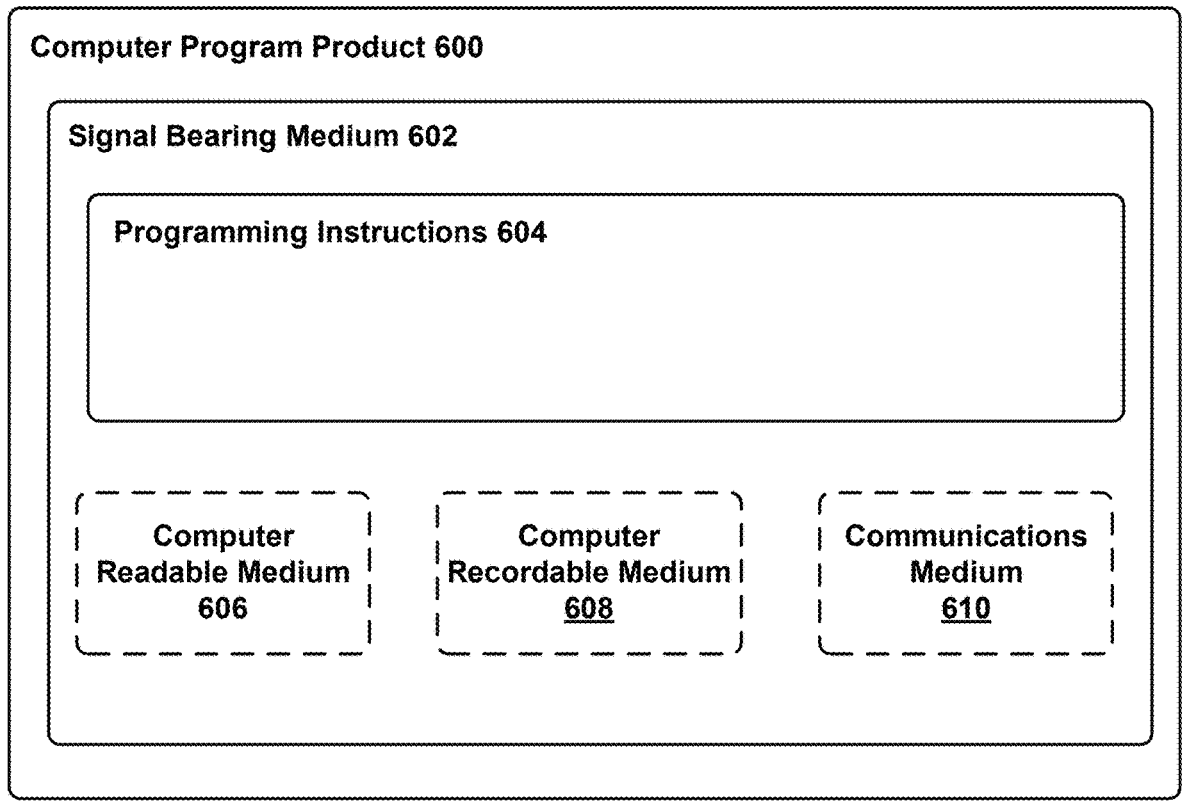
FIG. 6 is a schematic diagram of a computer program, according to an example implementation.

FIG. 6 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 600 is provided using signal bearing medium 902, which may include one or more programming instructions 604 that, when executed by one or more processors may provide functionality or portions of the functionality described above with respect to FIGS. 1-7. In some examples, the signal bearing medium 602 may encompass a non-transitory computer-readable medium 606, such as, but not limited to, a hard disk drive, a CD, a DVD, a digital tape, memory, components to store remotely (e.g., on the cloud), etc. In some implementations, the signal bearing medium 602 may encompass a communication medium (e.g., a fiber optic cable, a waveguide, a wired communications link, a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog wireless communication link, etc.). Similarly, the signal bearing medium 602 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 or remote computing system 302 and perhaps server computing systems of FIG. 3 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. An apparatus for determining a characteristic of a radome comprising:

a radar coupled to a vehicle, wherein the radar is at least partially protected by the radome, and wherein an outer surface of the radome is coated with a hydrophobic coating;
a memory for storing radar data; and
a computing device coupled to the vehicle, wherein the computing device is configured to:
cause a first radar signal to be transmitted by the radar toward an object;
receive first radar data representative of a first reflected radar signal, the first reflected radar signal comprising at least a portion of the first radar signal reflected from the object;
determine a first parameter associated with the first reflected radar signal based on at least the first radar data;
trigger a fluid to be sprayed onto the outer surface of the radome;
cause a second radar signal to be transmitted toward the object after the fluid is sprayed onto the outer surface of the radome;
receive second radar data representative of a second reflected radar signal, the second reflected radar signal comprising at least a portion of the second radar signal reflected from the object;
determine a second parameter associated with the second reflected radar signal based on at least the second radar data;
perform a first comparison between the first parameter and the second parameter to determine a performance metric that represents a current transmission loss caused by the radome, wherein the current transmission loss is caused at least in part by droplets of the fluid that remain on the outer surface of the radome;
perform a second comparison between the performance metric and a threshold value, wherein the threshold value represents a baseline transmission loss expected for the radome when the hydrophobic coating is in a non-degraded state; and
based on the second comparison indicating the performance metric exceeds the threshold value, provide an alert that indicates the radome is degrading performance of the radar, wherein providing the alert includes transmitting a notification to a second computing device positioned remotely from the vehicle, the notification indicating that the hydrophobic coating on the outer surface of the radome requires servicing.

2. The apparatus of claim 1, wherein the computing device is further configured to determine a transmission characteristic of the radome based on the first comparison.

3. The apparatus of claim 1, wherein the radome is formed from one or more plastic materials.

4. The apparatus of claim 1, wherein an outer surface of the radome includes a hydrophobic material or coating, and
wherein the performance metric depends on a condition of the hydrophobic material or coating on the outer surface of the radome.

5. The apparatus of claim 1, wherein each of the first and second radar signals are transmitted at a first frequency or on a first channel.

6. The apparatus of claim 1, further comprising a transmitter configured to generate radar signals and a receiver configured to generate the first radar data.

7. The apparatus of claim 1, wherein the computing device is further configured to:

determine the current transmission loss of the radome based on a difference between the first parameter and the second parameter.

8. The apparatus of claim 1, wherein the first parameter of the first reflected radar signal comprises a power characteristic, a magnitude, an amplitude, or a phase, and
wherein the second parameter of the second reflected radar signal comprises a power characteristic, a magnitude, an amplitude or a phase.

9. The apparatus of claim 1, wherein the computing device is further configured to:
apply air to the radome;
determine an updated performance metric;
perform a third comparison between the updated performance metric and the threshold value; and
based on the third comparison, determine if the radome is degrading performance of the radar.

10. The apparatus of claim 1, wherein the apparatus is coupled to a vehicle.

11. The apparatus of claim 1, wherein the computing device is further configured to:
activate a cleaning mechanism to clean the radome based on the performance metric exceeding the threshold value.

12. A method for determining characteristics of a radome comprising:
receiving, at a computing device and from a radar coupled to a vehicle, radar data, wherein the radar is at least partially protected by the radome, and wherein an outer surface of the radome is coated with a hydrophobic coating;
causing a first radar signal to be transmitted by the radar toward an object;
receiving, at the computing device, first radar data representative of a first reflected radar signal, the first reflected radar signal comprising at least a portion of the first radar signal reflected from the object;
determining, at the computing device, a first parameter associated with the first reflected radar signal based on at least the first radar data;
triggering a fluid to be sprayed onto the outer surface of the radome;
causing a second radar signal to be transmitted by the radar toward the object after the fluid is sprayed onto the outer surface of the radome;
receiving, at the computing device, second radar data representative of a second reflected radar signal, the second reflected radar signal comprising at least a portion of the second radar signal reflected from the object;
determining, at the computing device, a second parameter associated with the second reflected radar signal based on at least the second radar data;
perform a first comparison between the first parameter and the second parameter to determine a performance metric that represents a current transmission loss caused by the radome, wherein the current transmission loss is caused at least in part by droplets of the fluid that remain on the outer surface of the radome;
perform a second comparison between the performance metric and a threshold value, wherein the threshold value represents a baseline transmission loss expected for the radome when the hydrophobic coating is in a non-degraded state; and
based on the second comparison indicating the performance metric exceeds the threshold value, providing an alert that indicates the radome is degrading performance of the radar, wherein providing the alert includes transmitting a notification to a second computing device positioned remotely from the vehicle, the notification indicating that the hydrophobic coating on the outer surface of the radome requires servicing.

13. The method of claim 12, further comprising determining a transmission characteristic of the radome based on the first comparison.

14. The method of claim 12, wherein performing the first comparison between the first parameter and the second parameter comprises:
comparing a first power level associated with the first reflected radar signal to a second power associated with the second reflected radar signal, wherein the first power level represents a baseline power level generated when the radome is clear of debris and precipitation.

15. The method of claim 12, further comprising:
determining a shedding rate of the radome, wherein the shedding rate represents how fast precipitation clears off an outer surface of the radome.

16. The method of claim 12, wherein determining the first parameter associated with the first reflected radar signal comprises:
compiling first radar data during multiple time intervals, wherein the first radar data includes the first reflected radar signal; and
determining the first parameter based on the compiled first radar data.

17. The method of claim 12, further comprising:
obtaining measurements from a given radar at least partially protected by the calibrated radome;
determining the threshold value based on the measurements.

18. A non-transitory computer-readable medium configured to store instructions, that when executed by a computing system comprising one or more processors, causes the computing system to perform operations comprising:
receiving radar data from a radar coupled to a vehicle, wherein the radar is at least partially protected by a radome, and wherein an outer surface of the radome is coated with a hydrophobic coating;
causing a first radar signal to be transmitted by the radar and through the radome toward an object;
receiving first radar data representative of a first reflected radar signal, the first reflected radar signal comprising at least a portion of the first radar signal reflected from the object;
determining a first parameter associated with the first reflected radar signal based on at least the first radar data;
triggering a fluid to be sprayed onto the outer surface of the radome;
causing a second radar signal to be transmitted by the radar and through the radome toward the object after the fluid is sprayed onto the outer surface of the radome;
receiving second radar data representative of a second reflected radar signal, the second reflected radar signal comprising at least a portion of the second radar signal reflected from the object;
determining a second parameter associated with the second reflected radar signal based on at least the second radar data;
performing a first comparison between the first parameter and the second parameter to determine a performance metric that represents a current transmission loss caused by the radome, wherein the current transmission loss is caused at least in part by droplets of the fluid that remain on the outer surface of the radome;
performing a second comparison between the performance metric and a threshold value, wherein the threshold value represents a baseline transmission loss expected for the radome when the hydrophobic coating is in a non-degraded state; and
based on the second comparison indicating the performance metric exceeds the threshold value, providing an alert that indicates the radome is degrading performance of the radar, wherein providing the alert includes transmitting a notification to a second computing device positioned remotely from the vehicle, the notification indicating that the hydrophobic coating on the outer surface of the radome requires servicing.

* * * * *